United States Patent
Cheng et al.

(10) Patent No.: US 11,350,462 B2
(45) Date of Patent: May 31, 2022

(54) NPRACH HAVING IMPROVED RELIABILITY PERFORMANCE

(71) Applicant: QUALCOMM Incorporated, San Diego, CA (US)

(72) Inventors: Peng Cheng, Beijing (CN); Chao Wei, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 77 days.

(21) Appl. No.: 16/630,180

(22) PCT Filed: Aug. 21, 2018

(86) PCT No.: PCT/CN2018/101506
§ 371 (c)(1),
(2) Date: Jan. 10, 2020

(87) PCT Pub. No.: WO2019/037712
PCT Pub. Date: Feb. 28, 2019

(65) Prior Publication Data
US 2020/0154486 A1    May 14, 2020

(30) Foreign Application Priority Data
Aug. 21, 2017   (WO) ............... PCT/CN2017/098318

(51) Int. Cl.
*H04L 25/03*     (2006.01)
*H04L 27/26*     (2006.01)
(Continued)

(52) U.S. Cl.
CPC ....... *H04W 74/0833* (2013.01); *H04L 5/0053* (2013.01); *H04L 25/03866* (2013.01); *H04L 27/2613* (2013.01)

(58) Field of Classification Search
CPC ............. H04W 74/0883; H04L 5/0053; H04L 25/03866; H04L 27/2613; H04L 5/0012
See application file for complete search history.

(56) References Cited

U.S. PATENT DOCUMENTS 9,661,663 B1   5/2017 Lin et al.
2012/0075989 A1   3/2012 Roessel et al.
(Continued)

FOREIGN PATENT DOCUMENTS

WO   2017014715 A1   1/2017
WO   2017105693 A1   6/2017

OTHER PUBLICATIONS

Huawei et al., "Status Report to TSG: Further NB-IoT Enhancements", 3GPP TSG RAN Meeting #76, RP-171062, West Palm Beach, USA, Jun. 5-8, 2017, p. 7 "NPRACH False Alarm and Cell Range Enhancements", 14 Pages, section, line 13-22.
(Continued)

*Primary Examiner* — Faruk Hamza
*Assistant Examiner* — Abusayeed M Haque
(74) *Attorney, Agent, or Firm* — Procopio, Cory, Hargreaves & S; Nerrie M. Zohn

(57) ABSTRACT

NPRACH suffers from false alarms in which a base station detects and cannot distinguish an NPRACH signal that is intended for a different base station. An NPRACH may include a cell specific frequency shift pattern over repetitions and/or a repetition level scrambling sequence that enables a base station to more accurately detect NPRACH. An apparatus generates an NPRACH signal comprising multiple repetitions, wherein each repetition comprises multiple symbol groups. The apparatus may apply a different frequency shift between repetitions of the NPRACH signal. The frequency shift may comprise a cell specific random frequency shift pattern applied over each repetition. The apparatus may apply a repetition level scrambling sequence (Continued)

to the NPRACH signal, wherein a single scrambling sequence is applied to a set of repetitions comprised in the NPRACH signal. The apparatus transmits the NPRACH to a serving cell.

30 Claims, 12 Drawing Sheets

(51) Int. Cl.
*H04W 74/08* (2009.01)
*H04L 5/00* (2006.01)

(56) References Cited

U.S. PATENT DOCUMENTS

| | | | |
|---|---|---|---|
| 2013/0094409 | A1 | 4/2013 | Li et al. |
| 2015/0023282 | A1 | 1/2015 | Aiba et al. |
| 2017/0064743 | A1 | 3/2017 | Lei et al. |
| 2017/0223743 | A1* | 8/2017 | Lin ..................... H04L 27/2614 |
| 2018/0242101 | A1 | 8/2018 | Lin et al. |
| 2018/0332589 | A1* | 11/2018 | Wang ..................... H04L 5/0064 |
| 2019/0089504 | A1 | 3/2019 | Hwang et al. |
| 2019/0097853 | A1 | 3/2019 | Suzuki et al. |
| 2019/0098608 | A1* | 3/2019 | Yi ......................... H04L 5/0037 |
| 2019/0215872 | A1* | 7/2019 | Park ................... H04W 52/0216 |
| 2019/0342852 | A1* | 11/2019 | Marco ............... H04W 72/0453 |
| 2020/0187265 | A1* | 6/2020 | Luo ..................... H04L 27/2602 |
| 2020/0236524 | A1* | 7/2020 | Ye ......................... H04L 5/0094 |
| 2020/0374925 | A1* | 11/2020 | Su ....................... H04L 27/2607 |

OTHER PUBLICATIONS

International Search Report and Written Opinion—PCT/CN2017/098318—ISA/EPO—dated May 10, 2018.
Supplementary European Search Report—EP18849088—Search Authority—MUNICH—dated Apr. 13, 2021.
International Search Report and Written Opinion—PCT/CN2018/101506—ISA/EPO—dated Nov. 21, 2018.

* cited by examiner

NPRACH HAVING IMPROVED RELIABILITY PERFORMANCE

CROSS-REFERENCE TO RELATED APPLICATION

This application is a National Phase entry of PCT International Application No. PCT/CN2018/101506, entitled "NPRACH HAVING IMPROVED RELIABILITY PERFORMANCE", and filed on Aug. 21, 2018, which claims the benefit of PCT International Application No. PCT/CN2017/098318, entitled "NPRACH Having Improved Reliability Performance" and filed on Aug. 21, 2017, which are expressly incorporated by reference herein in their entirety.

BACKGROUND

Field

The present disclosure relates generally to communication systems, and more particularly, to communication including a Narrowband Physical Random Access Channel (NPRACH).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

A focus of the traditional LTE design relates to the improvement of spectral efficiency, ubiquitous coverage, and enhanced quality of service (QoS) support, etc. Current LTE system down link (DL) and uplink (UL) link budgets may be designed for coverage of high end devices, such as state-of-the-art smartphones and tablets. However, it may be desirable to support low cost low rate devices as well. Such communication may involve a reduction in a maximum bandwidth, e.g., a narrowband bandwidth, use of a single receive radio frequency (RF) chain, a reduction in peak rate, a reduction in transmit power, the performance of half duplex operation, etc. One example of such narrowband wireless communication is Narrowband-Internet of Things (NB-IoT), which may be limited to a single RB of system bandwidth, e.g., 180 kHz. Another example of narrowband wireless communication is enhanced machine type communication (eMTC), which may be limited to six RBs of system bandwidth.

Narrowband wireless communication involves unique challenges due to the limited frequency dimension of the narrow band. Additionally, low power operation may be very important for such low complexity devices. In these conditions, NPRACH suffers from false alarms where a base station may detect an NPRACH signal from a UE that is intended for a different base station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

NPRACH transmitted from a UE may suffer from false alarms in which a base station mistakenly detects an NPRACH signal that is intended for a different base station. The base station might not be able to distinguish the NPRACH signal from one that is intended for the base station. A solution is provided herein that reduces such NPRACH detection mistakes. As presented herein, NPRACH may include a repetition level scrambling sequence and/or a cell specific frequency shift pattern that is applied over repetitions that enables a base station to more accurately detect NPRACH.

In an aspect of the disclosure, a method, a computer-readable medium, and an apparatus are provided. The apparatus generates an NPRACH signal comprising multiple repetitions, wherein each repetition comprises multiple symbol groups. The apparatus applies a repetition level scrambling sequence to the NPRACH signal, wherein a single scrambling sequence is applied to a set of repetitions comprised in the NPRACH signal and transmits the NPRACH signal.

In another aspect of the disclosure, a method, a computer-readable medium, and an apparatus are provided. The apparatus generates an NPRACH signal comprising multiple repetitions, wherein each repetition comprises multiple symbol groups. The apparatus applies a different frequency shift between repetitions of the NPRACH signal and transmits the NPRACH signal. The frequency shift may comprise a cell specific random frequency shift pattern applied over each repetition.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
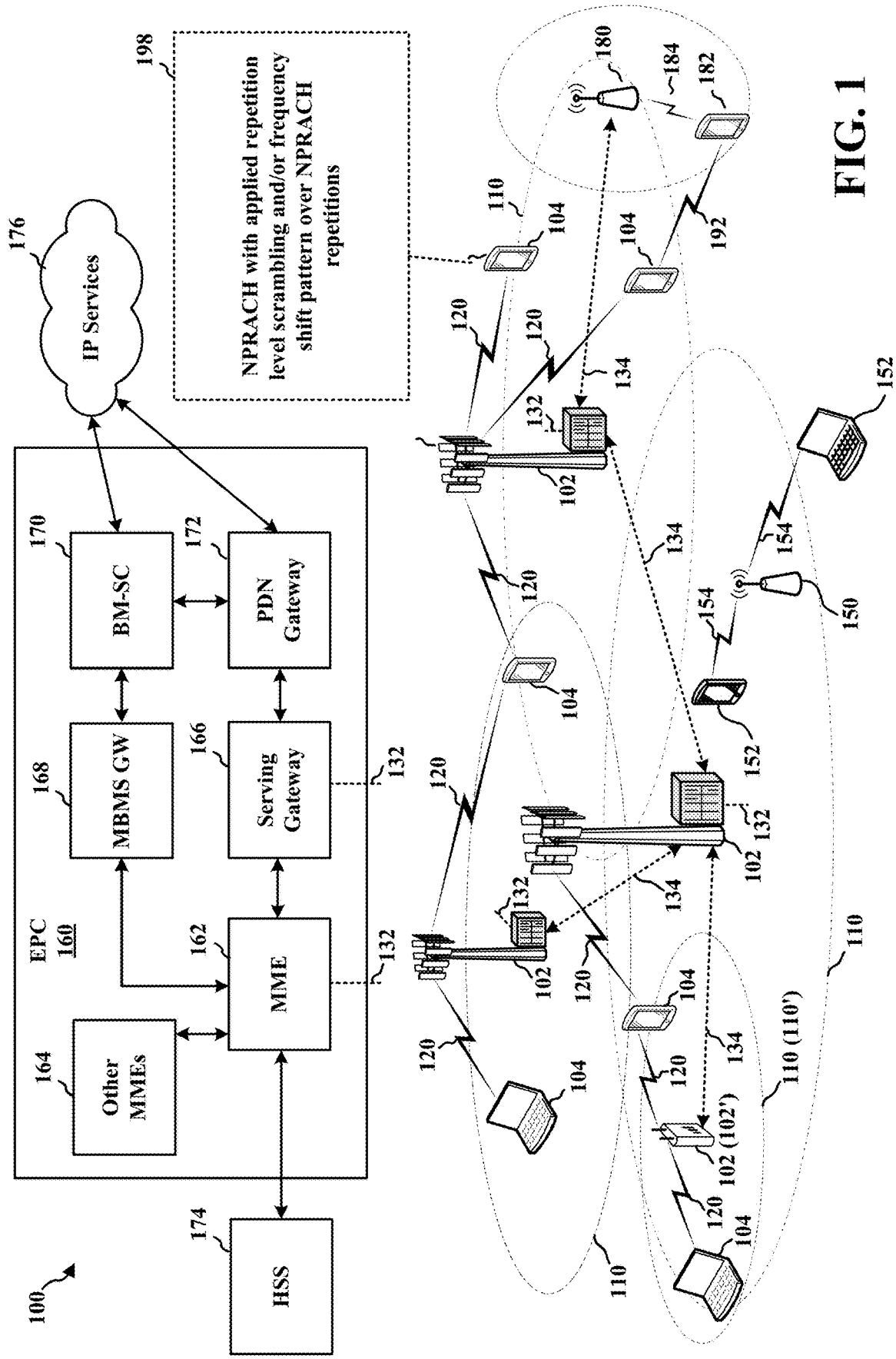
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The wireless communication system 100 may include communication 192 directly between UEs 104.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to generate an NPRACH and to apply a repetition level scrambling sequence and/or a frequency shift pattern over repetitions of the NPRACH (198).

Figure 2:
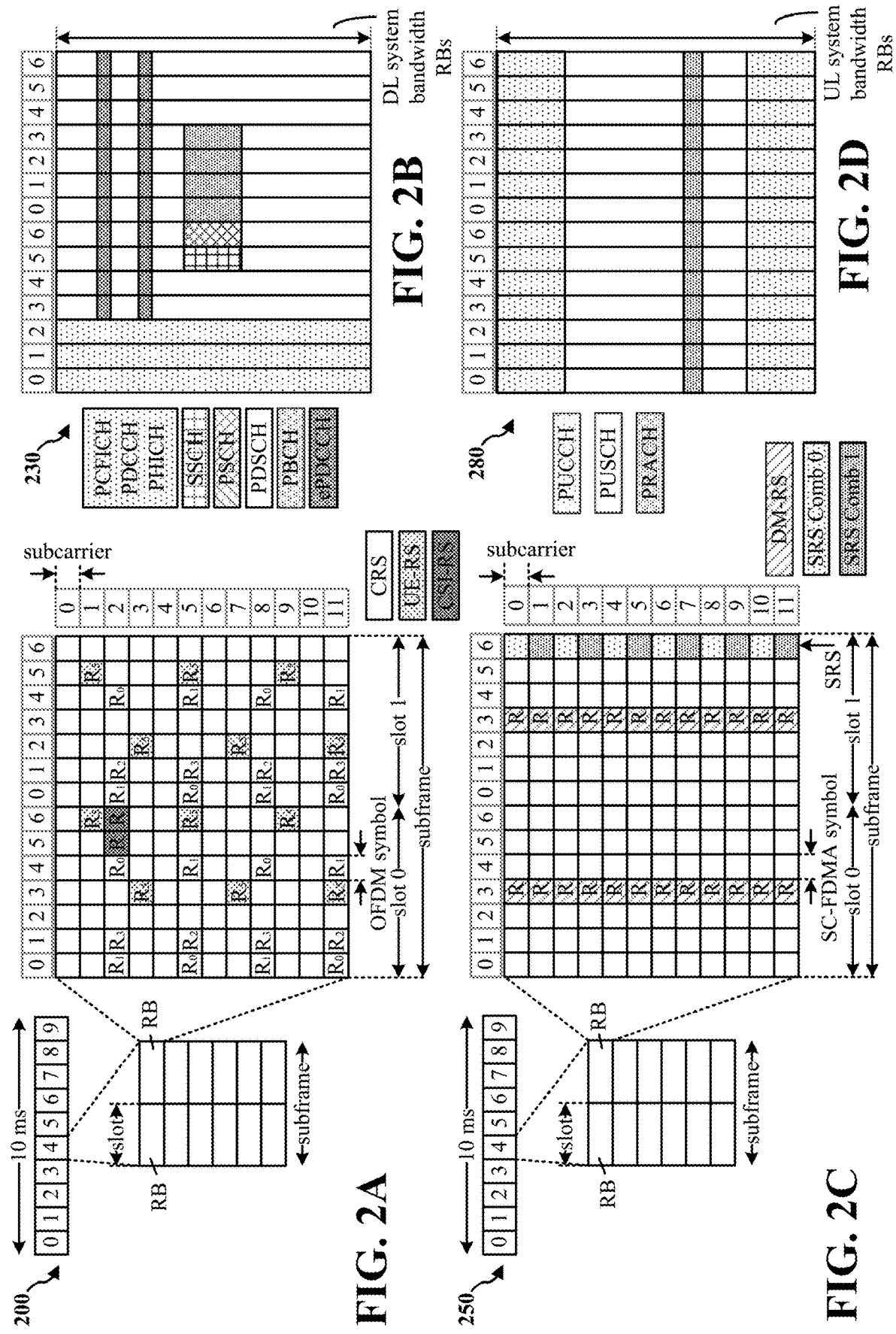
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
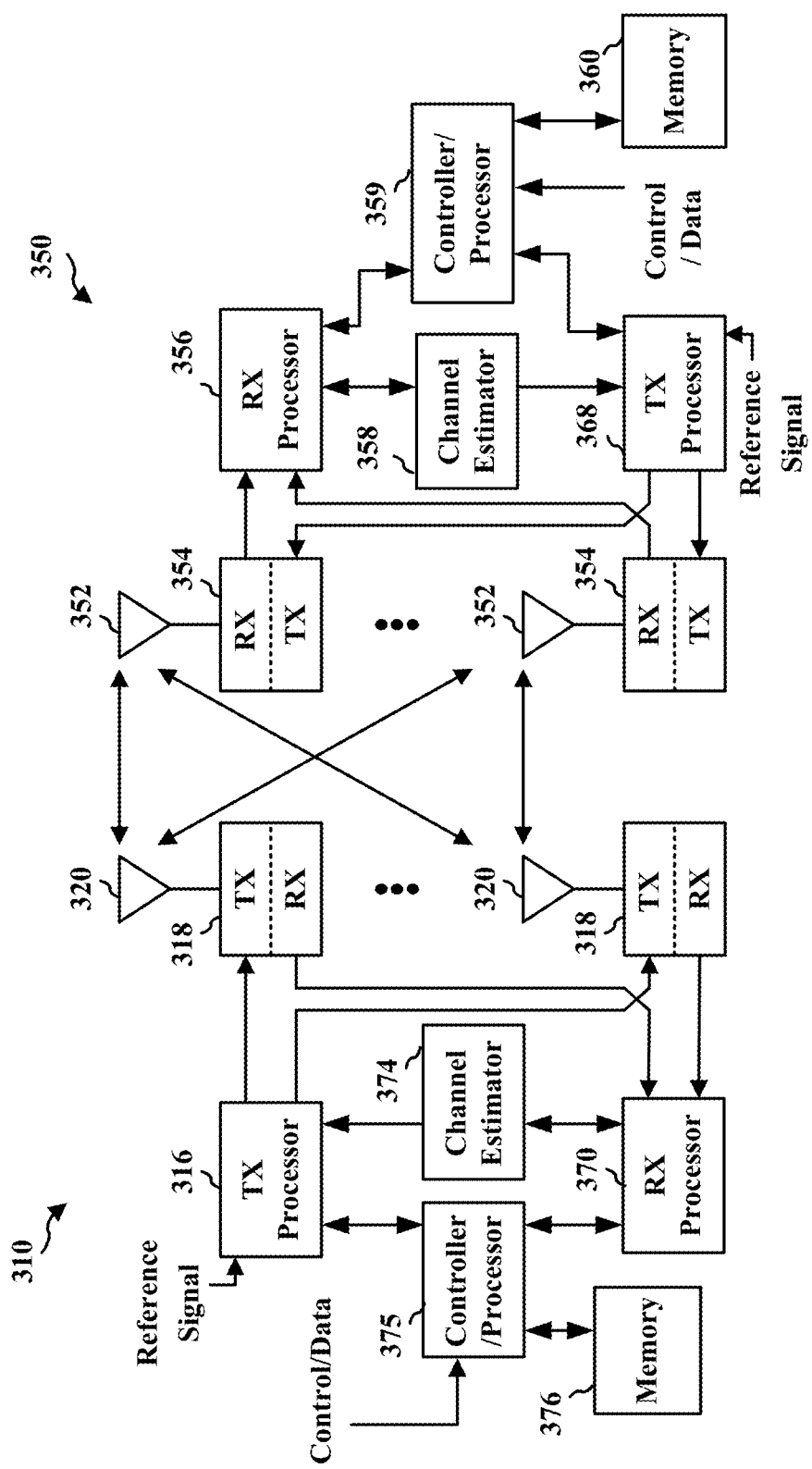
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Narrowband wireless communication involves unique challenges due to the limited frequency dimension of the narrow band. One example of such narrowband wireless communication is NB-IoT, which is limited to a single RB of system bandwidth, e.g., 180 kHz. Another example of narrowband wireless communication is eMTC, which is limited to six RBs of system bandwidth.

Multiple users may utilize the narrow band. While only some of the UEs may be active at a particular time, the narrowband communication should support such multi-user capacity. Additionally, narrowband communication may need to provide for deep coverage, by accounting for devices in environments requiring different Coverage Enhancement (CE) levels. For example, some devices may need as much as 20 dB of CE, which results in greater uplink transmission time interval (TTI) bundling, further limiting time resources.

NB-IoT communication may also involve a large cell radius, e.g., as much as approximately 35 km. Thus, the communication may involve a long delay, such as 200 µs, which may employ a long Cyclic Prefix (CP) length.

Similar challenges are involved with narrowband communication using eMTC, e.g., with Category 0, low cost MTC UEs. An MTC UE may be implemented with reduced peak data rates (e.g., a maximum of 1000 bits for a transport block size). Further, an MTC UE may be limited to supporting rank 1 transmissions and/or having 1 receive antenna. When an MTC UE is half-duplex, the MTC UE may have a relaxed switching timing (switching from transmission to reception or reception to transmission) compared to legacy or non-MTC UEs in accordance with the LTE standards. For example, a non-MTC UE may have a switching time on the order of 20 microseconds, while an MTC UE may have a switching time on the order of 1 millisecond. MTC UEs may monitor DL control channels in the same way as non-MTC UEs, e.g., monitoring wideband signals, monitoring for both PDCCH and EPDCCH, etc. Additional MTC enhancements may be supported. Although MTC UEs operate in a narrowband, the MTC UEs may also be capable of operation in a wider system bandwidth (e.g., 1.4/3/5/10/15/20 MHz). For example, the MTC UEs may work in a system bandwidth of 1.4 MHz and may use 6 resource blocks (RBs). Further, the MTC UEs may have enhanced coverage up to 15 dB.

Figure 4:
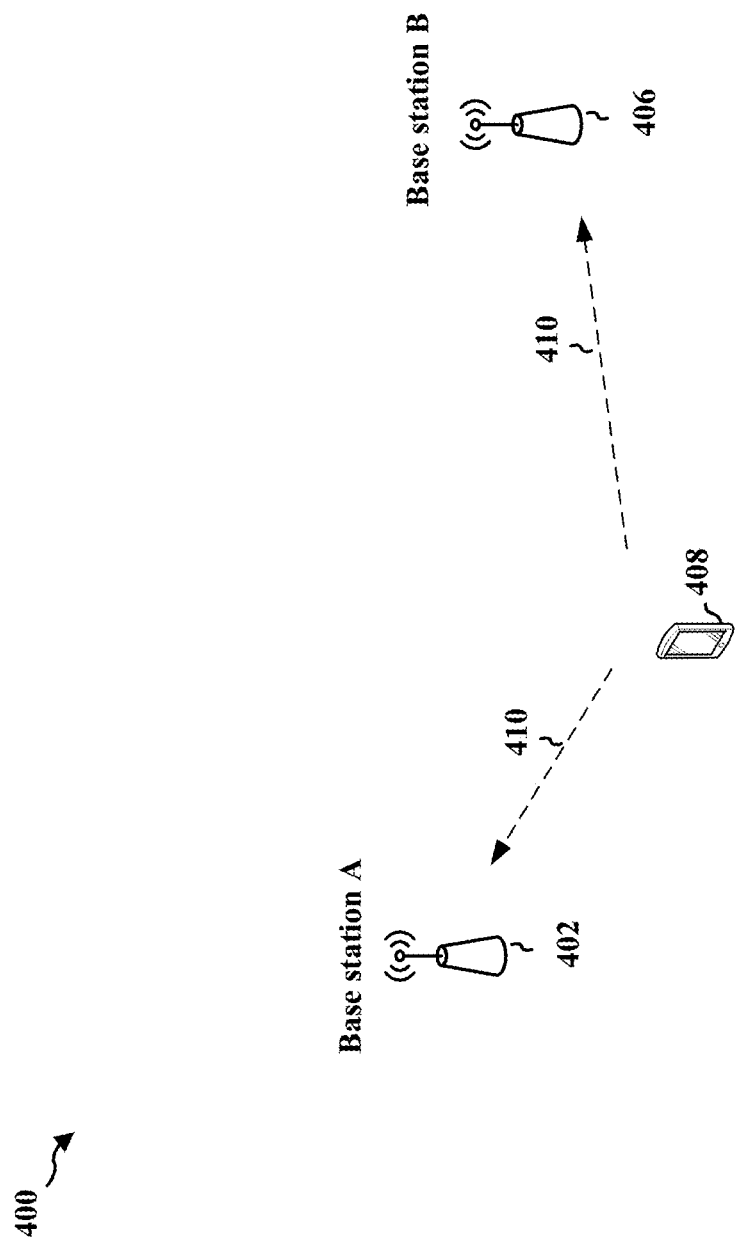
FIG. 4 is a diagram of a communications system in which an NPRACH signal may be falsely detected by a base station to which it was not intended.

NPRACH design, e.g., for NB-IoT, may suffer from false alarm problems due to inter-cell interference. For example, a cell may mistakenly detect an NPRACH signal from a UE that is intended for a different cell. FIG. 4 illustrates an example system 400 including base station 402 for a first cell and base station 406 for a second cell. When UE 408 transmits an NPRACH signal 410 to base station 402 for the first cell, the NPRACH signal 410 might also be received by base station 406 for the second cell, e.g., as an interfering signal. However, base station 406 might not be aware that the NPRACH 410 was not intended for the second cell. This may create a false alarm situation in which base station 406 receives an NPRACH signal 410 that was intended instead for a different cell, e.g., base station 402 for the first cell.

Figure 5:
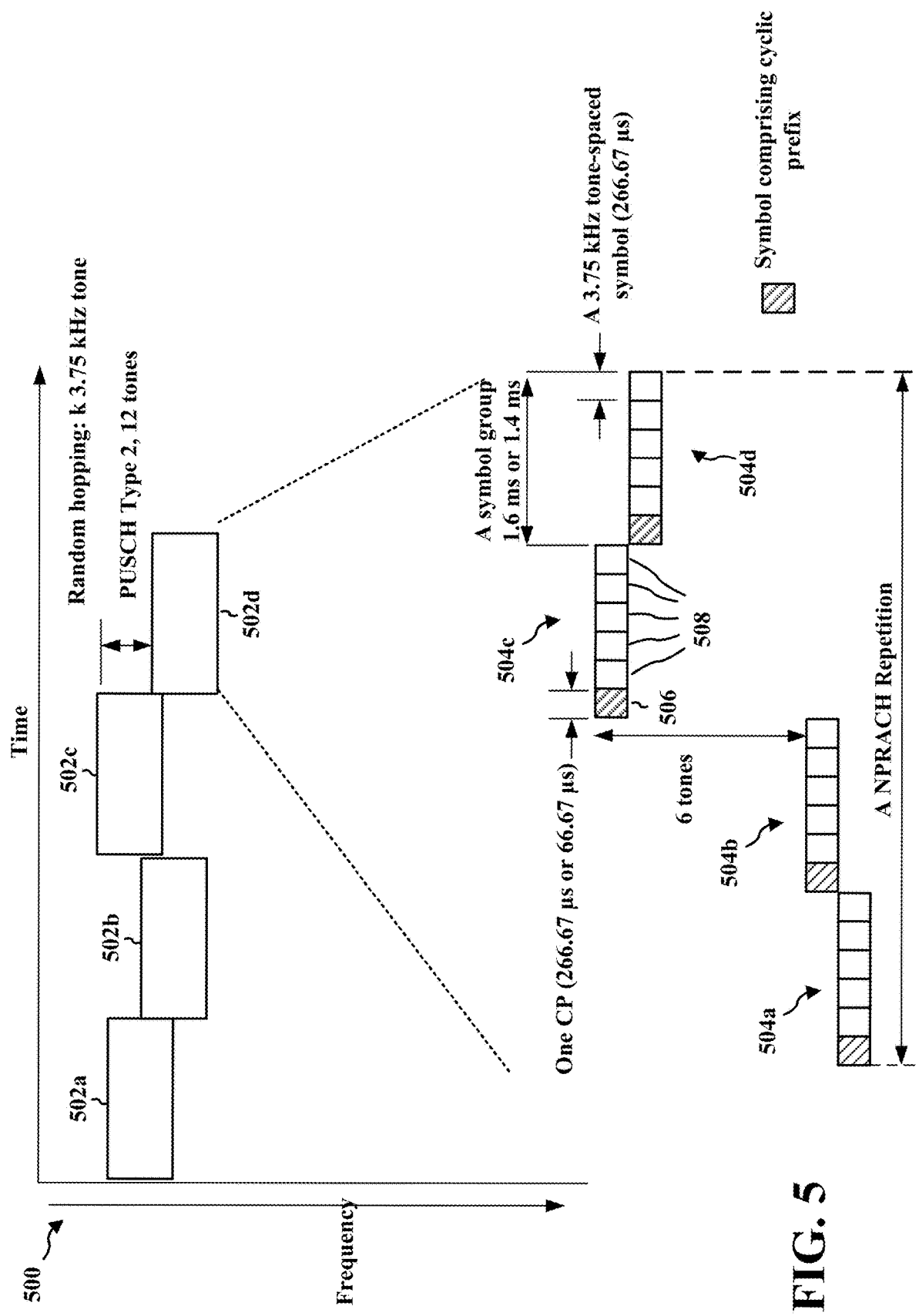
FIG. 5 illustrates aspects of an example NPRACH signal.

FIG. 5 illustrates an example NPRACH transmission 500. The NPRACH transmission comprises one or more repetitions 502a, 502b, 502c, 502d. Although only four repetitions are illustrated in FIG. 5, different numbers of repetitions may be used, e.g., up to 128 repetitions. As illustrated in FIG. 5, each repetition comprises four symbol groups 504a, 504b, 504c, 504d. Each symbol group (504a, 504b, 504c, 504d) comprises a cyclic prefix (CP) 506 and five contiguous same valued symbols 508 at a given 3.75 kHz tone. As each symbol transmission in the five symbols is the same, it may be difficult for a cell to distinguish an NPRACH from one UE from the NPRACH of another UE. A frequency hop of either 1 tone or −1 tone may be made between a first symbol group 504a and a second symbol group 504b of an NPRACH repetition 502a, 502b, 502c, 502d. Similarly, a frequency hop of either 1 or −1 may be made between a third symbol group 504c and a fourth symbol group 504d of an NPRACH repetition. Between the second symbol group 504b and the third symbol group 504c of the NPRACH repetition, a frequency hop of either 6 tones or −6 tones may be made. FIG. 5 illustrates a +1 tone hop between symbol groups 504a and 504b, a −1 tone hop between symbol groups 504c and 504d, and a +6 tone hop between symbol groups 504b and 504c.

Cell specific random hopping may occur between repetitions, e.g., as illustrated between 502c, 502d. The cell specific random hopping may be the only difference in NPRACH transmissions that enables a base station to distinguish an NPRACH intended for one cell from an NPRACH intended for another cell. Different coverage levels may be provided, and each coverage level may have a different number of NPRACH repetitions. For example, up to three different coverage levels may be defined, each having a different number of NPRACH repetitions. Each of the coverage levels may be represented by a repetition number. When NPRACH signals associated with different cells are differentiated only by cell specific random hopping between repetitions, there may be times when an NPRACH for a first cell is the same as the NPRACH for a second cell. For example, for a coverage level with one repetition, the 5 symbols in an NPRACH symbol group would be modulated by a constant value. Therefore, the NPRACH would be a sinusoidal signal with a frequency that is an integer multiple of 0.75 kHz. If two cells have NPRACH resources at least partially overlapped in time, an NPRACH signal to one cell (e.g., NPRACH 410 to base station 402) may be mistakenly detected by another cell (e.g., base station 406).

The false detection problem may be particularly problematic when the number of repetitions is small. For example, if two different UEs both have a coverage level represented by one repetition, the NPRACH signal will be the same for both UEs and a base station receiving the NPRACH will not know which UE transmitted the NPRACH. In the example in FIG. 4, if the NPRACH signal 410 is a single repetition NPRACH, base station 406 will not be able to determine whether the NPRACH signal 410 was intended for it or another cell. This false detection by the base station may be referred to as a collision, where the base station is unable to differentiate whether the NPRACH was intended for the base station or for another cell.

Figure 6A:
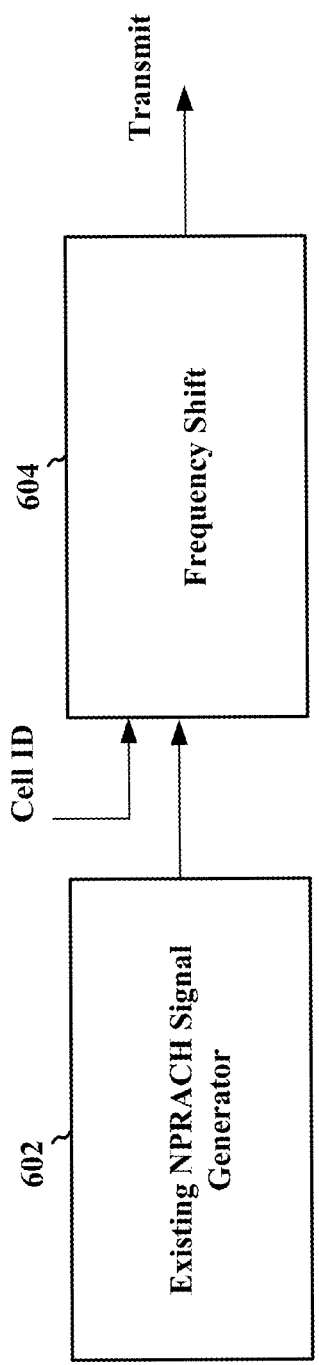
FIG. 6A illustrates an example system for generating an NPRACH signal having a frequency shift.
Figure 6B:
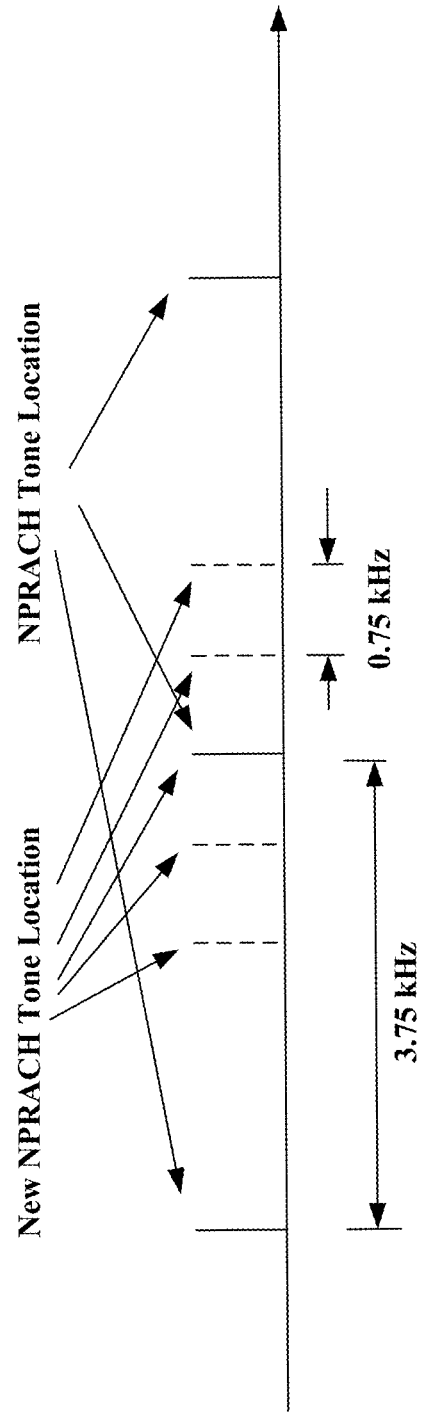
FIG. 6B illustrates a tone location of an example NPRACH signal shifted according to a set of possible frequency shifts.

A frequency shift may be applied to the NPRACH signal before transmitting the NPRACH signal. FIG. 6A illustrates that the frequency shift 604 may be applied after the NPRACH signal is generated by an NPRACH signal generator 602. Each symbol group may be transmitted as a signal of an integer multiple of 0.75 kHz. Two NPRACH signals allocated at tone k with frequency shifts m1*0.75 kHz and m2*0.75 kHz will be orthogonal to each other. In an example, five possible frequency shift values may be used, e.g., [−2, −1, 0, 1, 2]*0.75 kHz. FIG. 6B illustrates the new NPRACH tone locations in frequency based on the example of five frequency shift values.

In order to be backward compatible, legacy UEs may use shift 0 when transmitting NPRACH, e.g., regardless of the intended cells. UEs that are capable of the frequency shift may use one of the five shift values for a first frequency shift value, fd1, where fd1=[−2 −1 0 1 2]*0.75 kHz or one of the four values for a second frequency shift value, fd2, where fd2=[−2 −1 1 2]*0.75 kHz. A particular shift value may be assigned to a cell. For example, the shift value may be based on a cell ID and may be defined function of the cell ID. For instance, a UE may use either entry mod(cell_ID,5)+1 in connection with fd1 or entry mod(cell_ID,4)+1 in connection with fd2. This enables a frequency reuse factor of five or four, i.e., four or five cells may each have a different frequency for NPRACH. In another option, a base station may signal the particular frequency shift for the UE to use in NPRACH transmissions to the base station. For example, the base station may indicate the frequency shift to the UE in system information. The base station may signal multiple NPRACH resources, each with a different frequency shift or with the same frequency shift.

In general, assuming a hopping distance as an integer multiple, N, of single tone spacing (e.g., 0.75 kHz) and M symbols per symbol group (e.g., a contiguous transmission without frequency change), M shifts can be created with frequency shifts m*N/M Hz, m=0, . . . M−1. Each hop will have a duration 1/N.

However, if two cells have the same frequency shift, false alarms may still occur in which a base station detects an NPRACH that was intended for a different cell. As NPRACH may be employed in deep coverage with many repetitions, the high number of repetitions can lead to interference over a long period of time.

Random Frequency Shift Hopping Between Repetitions

In order to avoid having NPRACH signals intended for one cell from being falsely detected by a different cell, a random frequency shift hopping pattern may be applied to the NPRACH signal over the repetitions. The random frequency shift hopping pattern may be pseudo-random. The random frequency shift hopping pattern may be synchronized between the base station and the UE. For example, each cell may have a corresponding cell-specific frequency shift pattern that hops between repetitions.

For example, for NPRACH with 4 repetitions (e.g., 502a, 502b, 502c, 502d), may apply a frequency shift pattern of [2, −1, 0 1]*0.75 Khz for repetitions 1-4 (e.g., 502a, 502b, 502c, 502d), respectively. According to the example pattern [2, −1, 0, 1] for the four repetitions, a frequency shift based on [2]*0.75 KHz will be applied for the first repetition, a frequency shift of [−1]*0.75 KHz will be applied for the second repetition, a frequency shift of [0]*0.75 KHz will be applied for the third repetition, and a frequency shift of [1]*0.75 KHz will be applied for the fourth repetition.

The use of a frequency shift hopping pattern between repetitions reduces the probability of having a second cell (e.g., an interfered cell) with a same frequency shift k as a serving cell of a UE. In a design without the random frequency shift hopping over repetitions, a problem may arise when an NPRACH intended for one cell (e.g., a serving cell) has the same hopping pattern and a same frequency shift k employed by another cell (e.g., interfered cell) The second cell may falsely detect the NPRACH as an NPRACH intended for the second cell. As narrowband devices, e.g., NB UEs, may communicate under a deep coverage scenario, they may need to use a high number of NPRACH repetitions. If the same k is selected by two different cells, this may lead to a collision/false NPRACH detection that occurs over a long-duration. However, through the use of a cell-specific frequency shifting pattern for repetitions, the likelihood of two base stations using the same hopping pattern decreases with the larger numbers of repetitions. When a UE uses a large number of repetitions, the number of possible frequency shifting patterns for the repetitions increases exponentially. Therefore, the likelihood of false detection by a base station may be reduced.

When the frequency shift value is only changed per repetition according to the cell specific frequency shift pattern, increased complexity at the UE may be avoided.

The hopping pattern of the frequency shift, k, relating to a cell may be based on a function between k and a repetition index. In one example, the frequency shift hopping pattern may be a specified function based on k that may be known to the UE. Thus, the UE may determine and apply the hopping pattern once the UE is aware of k. The UE may apply the determined hopping pattern based on k and the repetition index for the corresponding repetition.

In another example, a base station may notify or otherwise indicate a hopping pattern index for the cell to the UE. The UE may use the index to determine a corresponding hopping pattern. The hopping pattern index may be notified or indicated to the UE in RRC signaling or system information signaling from the base station.

Scrambling Sequence

Figure 7A:
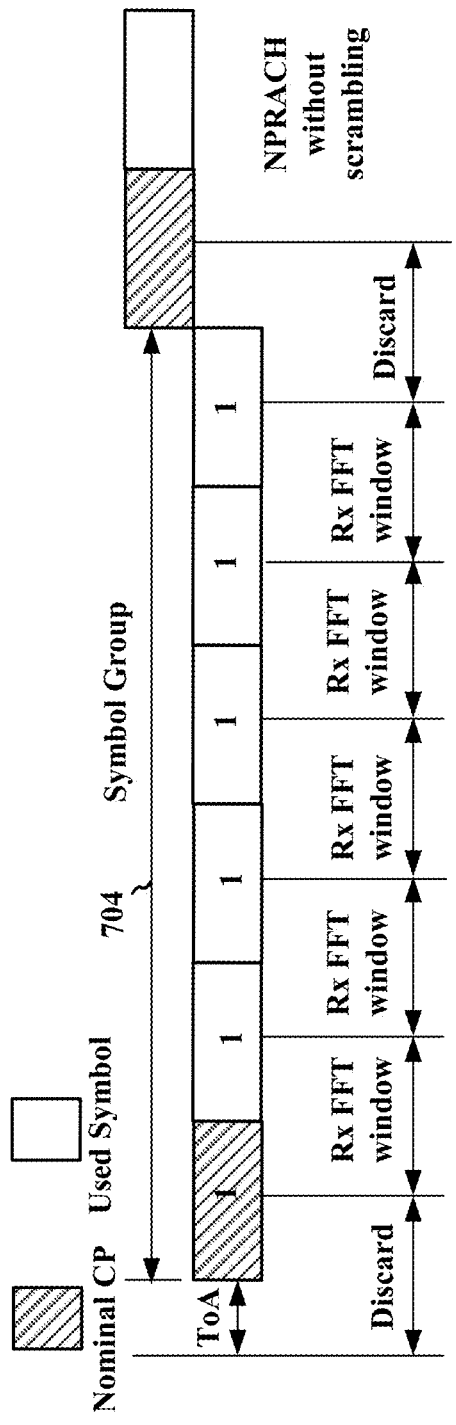
FIG. 7A illustrates an example NPRACH signal without scrambling.

A symbol or symbol group level scrambling may be applied to the generated NPRACH signal to reduce the occurrence of false NPRACH detection. For example, following the CP 506 symbol, the other symbols of the preamble sequence of the generated NPRACH (e.g., symbol sequence 508) may comprise the same value. These symbols of the NPRACH sequence may be regarded as comprising "1." FIG. 7A illustrates an example symbol group 704 of an NPRACH signal without scrambling. As illustrated in FIG. 7A, each of the symbols have a value "1."

Figure 7B:
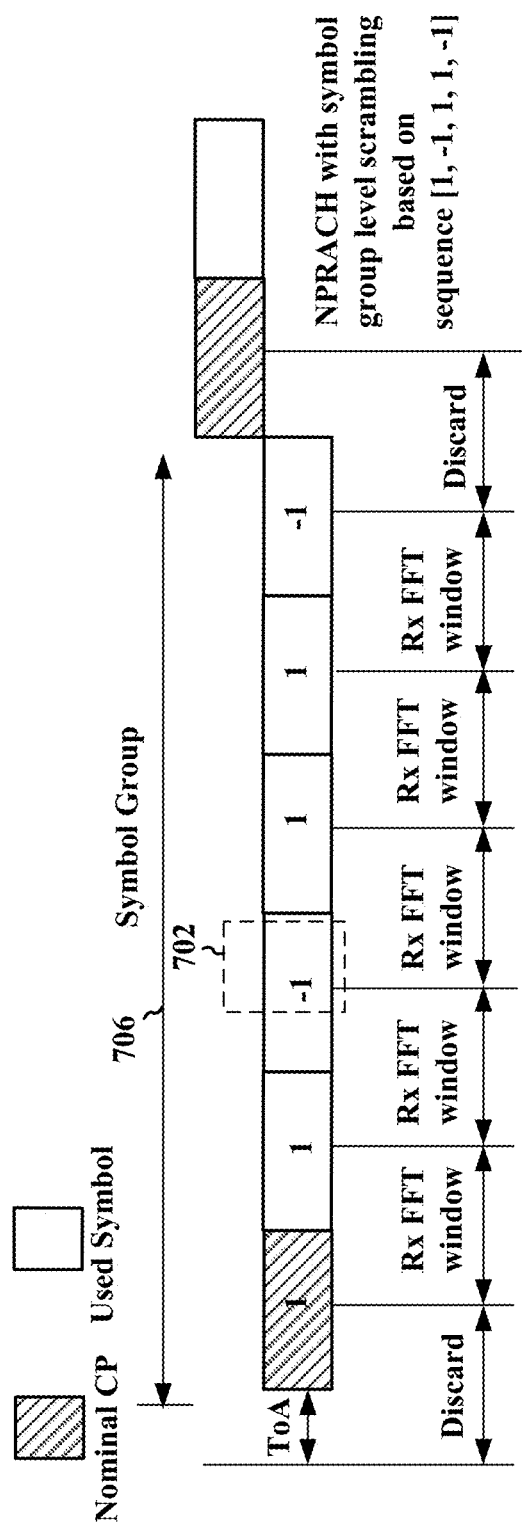
FIG. 7B illustrates an example NPRACH signal with symbol group level scrambling.

FIG. 7B illustrates an example symbol group 706, similar to the example symbol group of FIG. 7A, to which scrambling has been applied according to a scrambling sequence [1, −1, 1, 1, −1]. Different cells may apply different symbol or symbol-group level scrambling, which may further separate NPRACH signals intended for different cells. The different scrambling sequences may enable a base station to determine whether a received NPRACH was intended for the base station or for a different cell.

However, such scrambling may cause errors in FFT processing at a receiver. For example, the scrambled second symbol 702 of the preamble, which is multiplexed as "−1," may mistakenly be regarded by a receiver as a CP of a third symbol of the preamble, which is not multiplexed. If the NPRACH has some delay, the third symbol of the preamble may include a part of the second symbol. This may cause problems for FFT processing, which may create sources of false NPRACH detection. The orthogonality of preamble transmissions on different subcarriers may be lost, which may also lead to new sources of false NPRACH detection.

Figure 8:
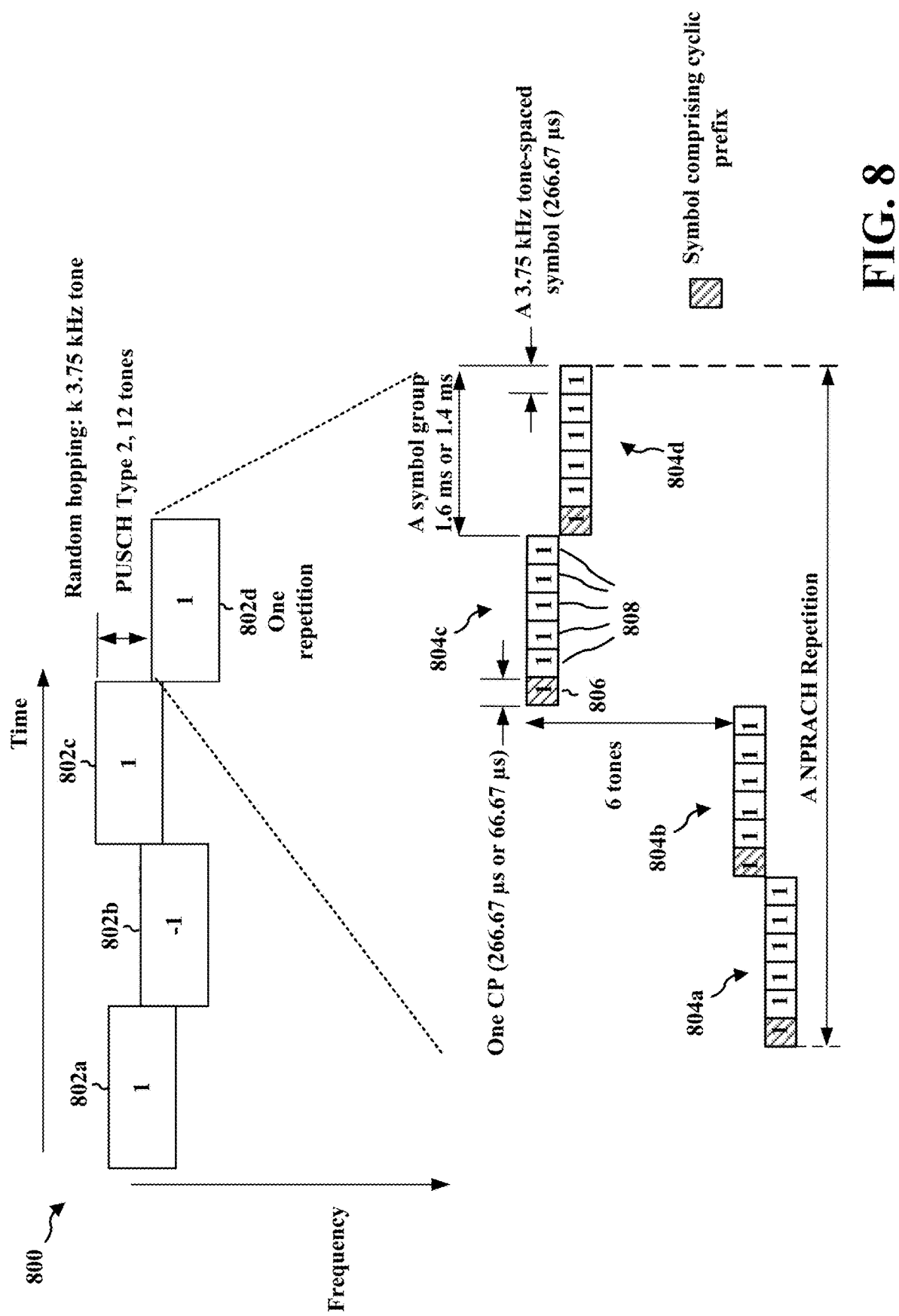
FIG. 8 illustrates an example NPRACH signal with repetition level scrambling.

In order to avoid such FFT processing errors that may be created through symbol-group or symbol level scrambling while still providing for differentiation between NPRACH signals intended for different cells, scrambling may instead be applied on a repetition level. FIG. 8 illustrates an example NPRACH signal 800 having repetition level scrambling according to an example scrambling sequence [1, −1, 1, 1]. Thus, each symbol in the four symbol groups of the first repetition 802a will have an applied scrambling based on "1." Each symbol in the four symbol groups of the second repetition 802b will have an applied scrambling based on "−1." Each symbol in the four symbol groups of the third repetition 802c will have an applied scrambling based on "1." Each symbol in the four symbol groups of the fourth repetition 802d will have an applied scrambling based on "1." FIG. 8 illustrates the four symbol groups 804a, 804b, 804c, and 804d having CP 806 and symbols 808 each scrambled based on "1" according to the repetition level scrambling sequence. Similarly, each symbol of the symbol groups in repetition 802b would be scrambled based on "−1."

For large amounts of repetition, the repetition level scrambling may provide a very unique sequence that will enable a base station to correctly detect NPRACH signals.

A scrambling sequence may be based on a function between scrambling sequences and cell ID. Thus, the scrambling sequence may be cell specific. A function may be specified, and a UE may be able to determine the scrambling sequence based on the cell ID for the intended cell (e.g., serving cell).

In another example, a base station may notify the UE of a scrambling sequence index, e.g., in RRC signaling or in system information. The base station may also indicate a scrambling sequence to the UE in another manner.

In one example, a random frequency shift hopping pattern may be applied to the NPRACH signal over the repetitions and a repetition level scrambling may be applied to the NPRACH signal.

Figure 9:
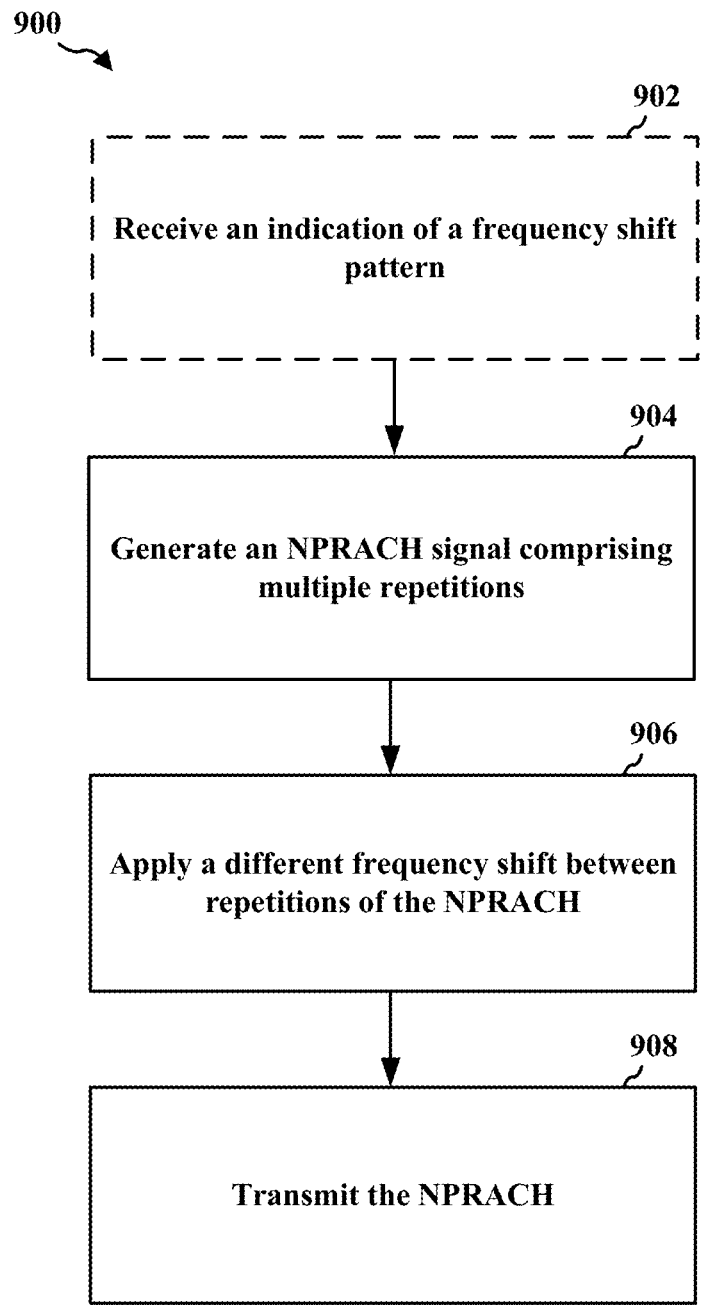
FIG. 9 is a flowchart of a method of wireless communication.

FIG. 9 is a flowchart 900 of a method of wireless communication. The method may be performed by a UE (e.g., the UE 104, 350, 408, the apparatus 1102, 1102'). Optional steps of the method are provided in boxes with dashed lanes. In this method the UE reduces false alarms in which a base station mistakenly detects an NPRACH signal that is intended for a different base station by applying a different frequency shift between repetitions of the NPRACH signal. The UE may apply a cell specific frequency shift pattern over repetitions that enables a base station to more accurately detect NPRACH.

At 904, the UE generates a narrowband physical random access channel (NPRACH) signal comprising multiple repetitions (e.g., as described in connection with FIG. 5), wherein each repetition comprises multiple symbol groups.

At 906, the UE applies a different frequency shift between repetitions of the NPRACH signal. Thus, a first frequency shift may be applied to a first repetition, a second frequency shift may be applied to a second repetition, a third frequency shift may be applied to a third repetition, etc.

At 908, the UE transmits the generated NPRACH signal having the applied frequency shifts. A pattern of frequency shifts may be applied to the NPRACH signal. The pattern may comprise a cell-specific frequency shift pattern (e.g., a random frequency shift hopping pattern) corresponding to a base station to which the NPRACH signal is transmitted. The random frequency shift hopping pattern may be pseudo-random. The random frequency shift hopping pattern may be synchronized between the base station and the UE. The hopping pattern may be applied over each repetition. The use of a repetition level frequency shift hopping pattern may enable base stations to correctly detect NPRACH signals from the UE.

In one example, the pattern of frequency shifts may be based on a specified function, the function being based on a repetition index and a corresponding frequency shift.

In another example, the UE may receive, at 902, an indication of the pattern of frequency shifts from a base station. The indication may comprise a frequency shift pattern index. The indication may be comprised in RRC signaling or system information signaling. Thus, the UE may apply a pattern of frequency shifts at 906 based on the indication received at 902.

Figure 10:
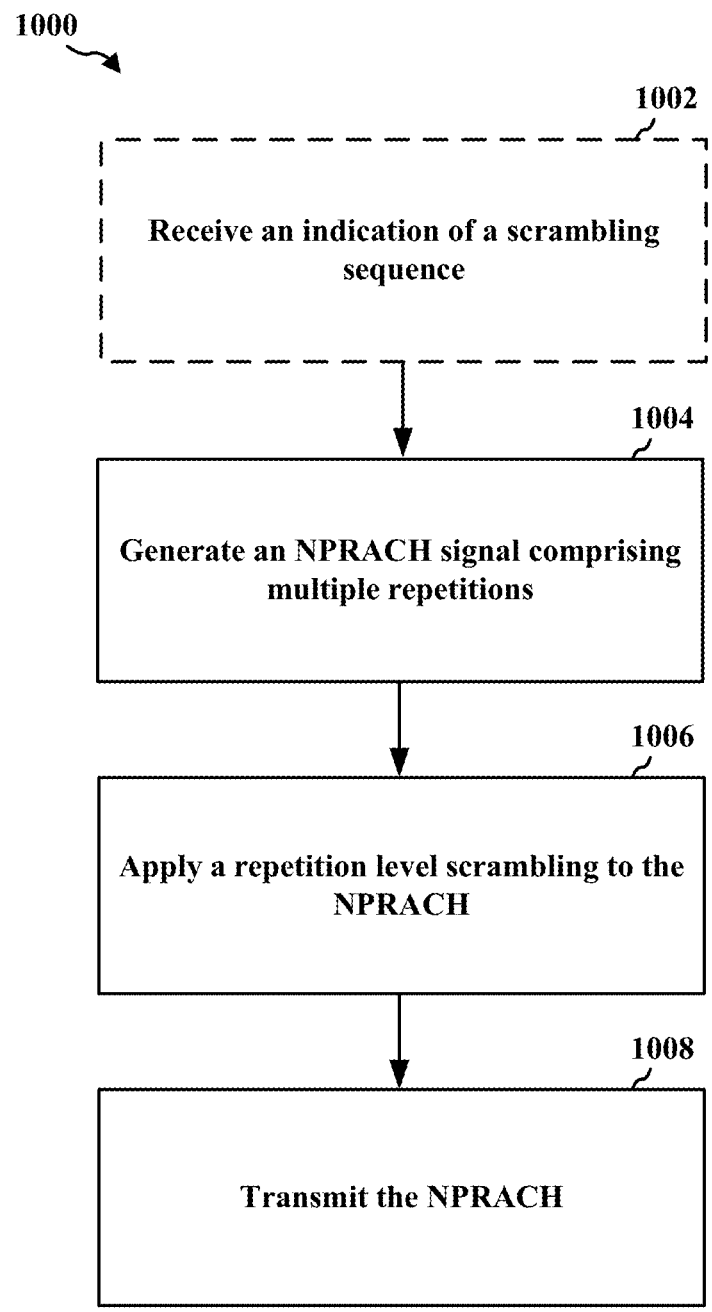
FIG. 10 is a flowchart of a method of wireless communication.

FIG. 10 is a flowchart 1000 of a method of wireless communication. The method may be performed by a UE (e.g., the UE 104, 350, 408, the apparatus 1102, 1102'). Optional steps of the method are provided in boxes with dashed lanes. In this method the UE reduces false alarms in which a base station mistakenly detects an NPRACH signal that is intended for a different base station by applying a repetition level scrambling to the NPRACH signal. The repetition level scrambling may enable a base station to more accurately detect NPRACH.

At 1004, the UE generates a narrowband physical random access channel (NPRACH) signal comprising multiple repetitions (e.g., as described in connection with FIG. 5), wherein each repetition comprises multiple symbol groups.

At 1006, the UE applies a repetition level scrambling sequence to the NPRACH signal, wherein a single scrambling sequence is applied to a set of repetitions comprised in the NPRACH signal. FIG. 8 illustrates an example of repetition level scrambling applied to an NPRACH signal.

In one example, the repetition level scrambling sequence is based on a function between a scrambling sequence and a cell ID for a base station to which the NPRACH signal is transmitted.

In another example, the UE may receive, at 1002, an indication of the scrambling sequence from a base station. The indication may comprise a scrambling sequence index. The indication may be comprised in RRC signaling or system information transmitted to the UE from the base station. Thus, the UE may apply a scrambling sequence at 1006 based on the indication received at 1002.

At 1008, the UE transmits the generated NPRACH signal having the applied repetition level scrambling. The use of a repetition level scrambling may enable base stations to correctly detect NPRACH signals from the UE.

Although FIGS. 9 and 10 are illustrated separately, both repetition level scrambling and a frequency shift pattern over repetitions may be applied to an NPRACH.

Figure 11:
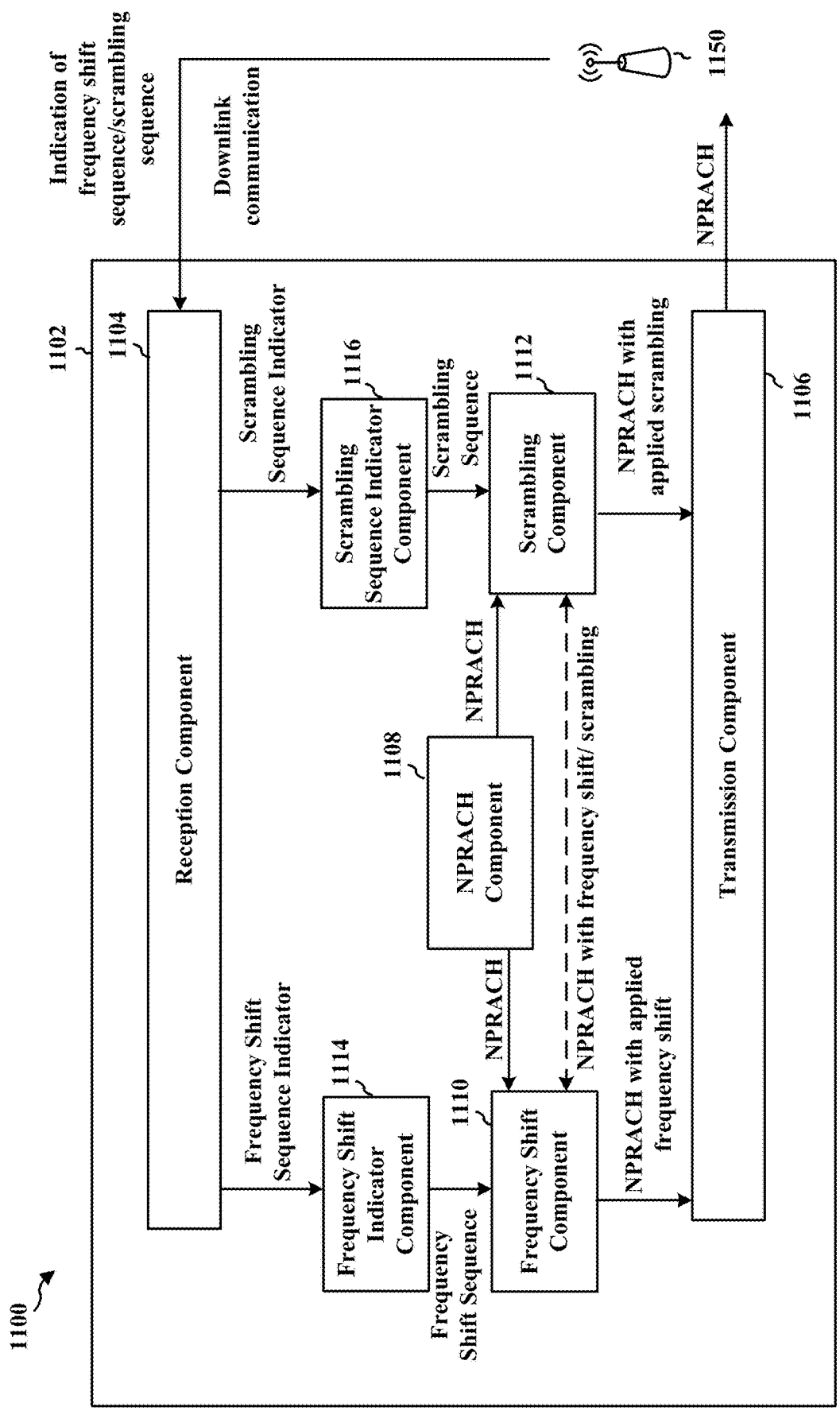
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a UE (e.g., the UE 104, 350, 408). The apparatus includes a reception component 1104 that receives downlink communication from a base station 1150 and a transmission component 1106 that transmits uplink communication to the base station. The apparatus may include an NPRACH component 1108 that generates an NPRACH signal comprising multiple repetitions, wherein each repetition comprises multiple symbol groups. Aspects of an example NPRACH signal are described in connection with FIG. 5. The apparatus may include a frequency shift component 1110 that applies a different frequency shift between repetitions of the NPRACH signal. Thus, the frequency shift component may receive the generated NPRACH signal from the NPRACH component 1108 and apply the frequency shift between repetitions of the NPRACH before the transmission component 1106 transmits the NPRACH. The frequency shift between repetitions may comprise a pattern, e.g., a cell-specific frequency shift pattern corresponding to a base station 1150 to which the NPRACH signal is transmitted. The frequency shift pattern may be based on a function of a repetition and a corresponding frequency shift. In another example, the frequency shift pattern may be indicated to the apparatus by the base station 1150. Therefore, the apparatus may include a frequency shift sequence indicator component 1114 that receives an indication of the pattern of frequency shifts from the base station 1150 (e.g., in RRC signaling/ system information) and provides the corresponding frequency shift sequence to the frequency shift component 1110.

The apparatus may comprise a scrambling component 1112 that applies a repetition level scrambling sequence to the NPRACH signal, wherein a single scrambling sequence is applied to a set of repetitions comprised in the NPRACH signal. An example of a scrambling sequence is described in connection with FIG. 8. The scrambling component 1112 may receive the generated NPRACH from the NPRACH component 1108 and may apply the scrambling sequence before the transmission component 1106 transmits the NPRACH. The scrambling sequence may be based on a function between a scrambling sequence and a cell ID of the serving cell. Thus, the apparatus may be able to determine the scrambling sequence based on the cell ID. In another example, the apparatus may comprise a scrambling sequence indicator component 1116 that receives an indication of the scrambling sequence from the base station 1150 (e.g., in RRC signaling/system information) and provides the corresponding scrambling sequence to the scrambling component 1112.

In an example, both a frequency shift between repetitions and a repetition level scrambling sequence may be applied to the NPRACH before transmission to the base station 1150. As illustrated in FIG. 11, the scrambling component 1112 may apply a scrambling sequence to the NPRACH generated by the NPRACH component 1108 and provide the scrambled NPRACH to the frequency shift component 1110 that then applies a frequency shift between repetitions of the NPRACH before the NPRACH is transmitted. Alternately, the frequency shift component 1110 may apply a frequency shift between repetitions of the NPRACH generated by the NPRACH component 1108 and may provide the frequency shifted NPRACH signal to the scrambling component. The scrambling component may then apply a repetition level scrambling sequence to the NPRACH before the NPRACH is transmitted to the base station 1150.

The apparatus may include additional components that perform each of the blocks of the algorithm in the aforementioned flowcharts of FIGS. 9 and 10. As such, each block in the aforementioned flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
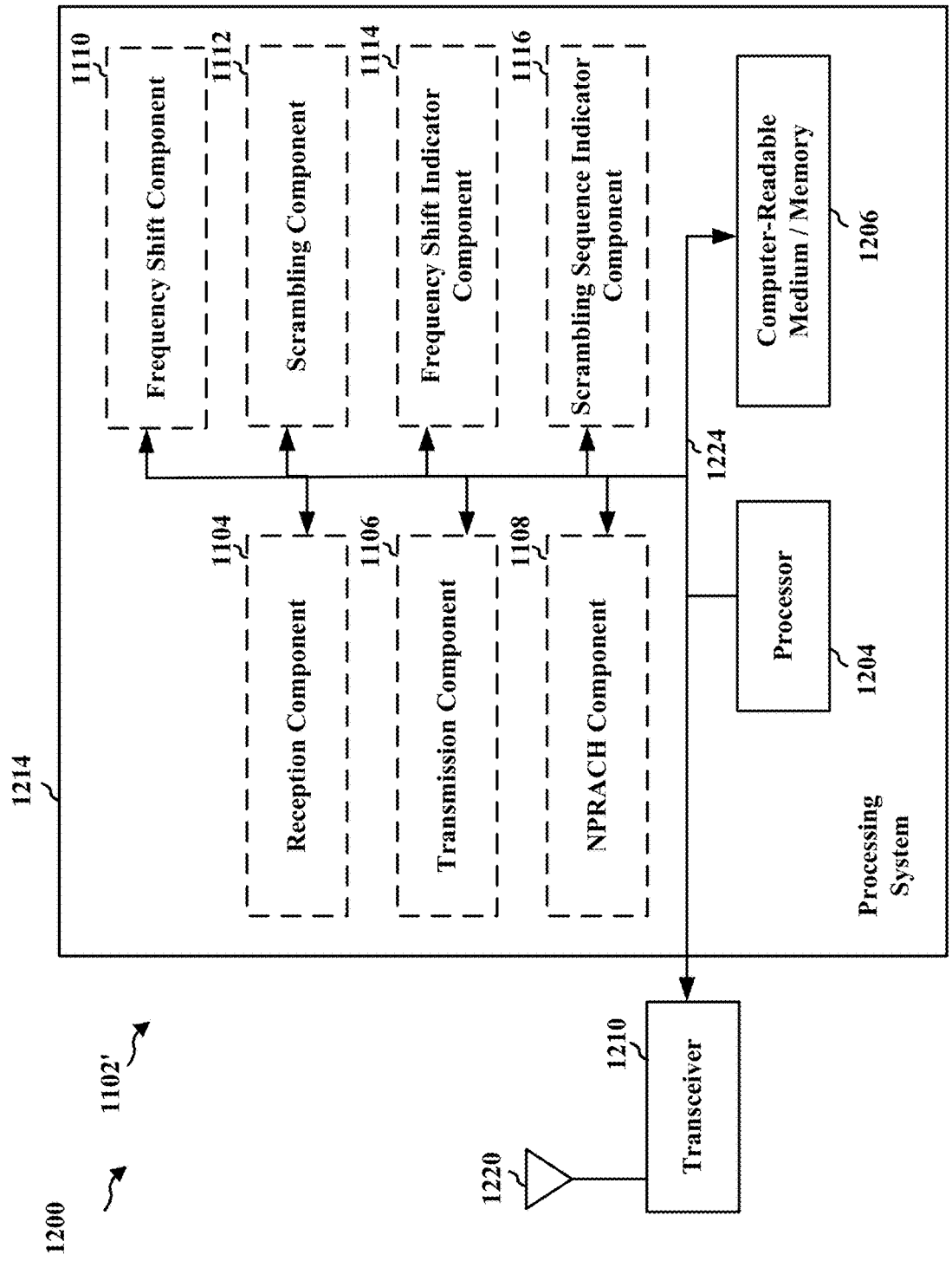
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1106, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359.

In one configuration, the apparatus 1102/1102' for wireless communication includes means for generating a narrowband physical random access channel (NPRACH) signal comprising multiple repetitions, means for applying a different frequency shift between repetitions of the NPRACH signal, means for means for applying a repetition level scrambling sequence to the NPRACH signal, means for receiving an indication of the scrambling sequence from a base station, means for receiving an indication of the pattern of frequency shifts from a base station, and means for transmitting the generated NPRACH signal. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    generating a narrowband physical random access channel (NPRACH) signal for transmission to a cell comprising multiple repetitions, wherein each repetition comprises multiple symbol groups;
    applying a repetition level scrambling sequence to the NPRACH signal, wherein a single scrambling sequence is applied across a set of multiple repetitions comprised in the NPRACH signal in which each symbol within the multiple symbol groups of a repetition are scrambled with a same element of the scrambling sequence and each of the multiple repetitions comprised in NPRACH signal is scrambled with a different element of the scrambling sequence; and
    transmitting the NPRACH signal to a base station.

2. The method of claim 1, wherein the repetition level scrambling sequence is cell specific.

3. The method of claim 2, wherein the repetition level scrambling sequence is based on a cell identifier (ID) for the base station to which the NPRACH signal is transmitted.

4. The method of claim 1, further comprising:
receiving an indication of a scrambling sequence from the base station.

5. The method of claim 4, wherein the indication comprises a scrambling sequence index comprised in Radio Resource Control (RRC) signaling or system information signaling.

6. The method of claim 1, further comprising:
applying a different frequency shift between repetitions of the NPRACH signal.

7. The method of claim 6, wherein a pattern of frequency shifts is applied to the NPRACH signal.

8. The method of claim 7, wherein the pattern of frequency shifts comprises a cell-specific frequency shift pattern corresponding to the base station to which the NPRACH signal is transmitted.

9. The method of claim 7, wherein the pattern of frequency shifts comprises a random frequency shift hopping pattern.

10. The method of claim 9, wherein the pattern of frequency shifts comprises a hopping pattern applied over each repetition.

11. The method of claim 7, wherein the pattern of frequency shifts is based on a specified function, the function being based on a repetition index and a corresponding frequency shift.

12. The method of claim 7, further comprising:
receiving an indication of the pattern of frequency shifts from the base station.

13. An apparatus for wireless communication, comprising:
means for generating a narrowband physical random access channel (NPRACH) signal for transmission to a cell comprising multiple repetitions, wherein each repetition comprises multiple symbol groups;
means for applying a repetition level scrambling sequence to the NPRACH signal, wherein a single scrambling sequence is applied across a set of multiple repetitions comprised in the NPRACH signal in which each symbol within the multiple symbol groups of a repetition are scrambled with a same element of the scrambling sequence and each of the multiple repetitions comprised in NPRACH signal is scrambled with a different element of the scrambling sequence; and
means for transmitting the NPRACH signal to a base station.

14. The apparatus of claim 13, wherein the repetition level scrambling sequence is cell specific.

15. The apparatus of claim 14, wherein the repetition level scrambling sequence is based on a cell identifier (ID) for the base station to which the NPRACH signal is transmitted.

16. The apparatus of claim 13, further comprising:
means for receiving an indication of a scrambling sequence from the base station.

17. The apparatus of claim 16, wherein the indication comprises a scrambling sequence index comprised in Radio Resource Control (RRC) signaling or system information signaling.

18. The apparatus of claim 13, further comprising:
means for applying a different frequency shift between repetitions of the NPRACH signal.

19. An apparatus for wireless communication, comprising:
a memory; and
at least one processor coupled to the memory and configured to:
generate a narrowband physical random access channel (NPRACH) signal for transmission to a cell comprising multiple repetitions, wherein each repetition comprises multiple symbol groups;
apply a repetition level scrambling sequence to the NPRACH signal, wherein a single scrambling sequence is applied across a set of multiple repetitions comprised in the NPRACH signal in which each symbol within the multiple symbol groups of a repetition are scrambled with a same element of the scrambling sequence and each of the multiple repetitions comprised in NPRACH signal is scrambled with a different element of the scrambling sequence; and
transmit the NPRACH signal to a base station.

20. The apparatus of claim 19, wherein the repetition level scrambling sequence is cell specific.

21. The apparatus of claim 20, wherein the repetition level scrambling sequence is based on a cell identifier (ID) for the base station to which the NPRACH signal is transmitted.

22. The apparatus of claim 19, wherein the at least one processor is further configured to:
receive an indication of a scrambling sequence from the base station.

23. The apparatus of claim 22, wherein the indication comprises a scrambling sequence index comprised in Radio Resource Control (RRC) signaling or system information signaling.

24. The apparatus of claim 19, wherein the at least one processor is further configured to:
apply a different frequency shift between repetitions of the NPRACH signal.

25. A non-transitory computer-readable medium storing computer executable code, comprising code to:
generate a narrowband physical random access channel (NPRACH) signal for transmission to a cell comprising multiple repetitions, wherein each repetition comprises multiple symbol groups;
apply a repetition level scrambling sequence to the NPRACH signal, wherein a single scrambling sequence is applied across a set of multiple repetitions comprised in the NPRACH signal in which each symbol within the multiple symbol groups of a repetition are scrambled with a same element of the scrambling sequence and each of the multiple repetitions comprised in NPRACH signal is scrambled with a different element of the scrambling sequence; and
transmit the NPRACH signal to a base station.

26. The non-transitory computer-readable medium of claim 25, wherein the repetition level scrambling sequence is cell specific.

27. The non-transitory computer-readable medium of claim 26, wherein the repetition level scrambling sequence is based on a cell identifier (ID) for the base station to which the NPRACH signal is transmitted.

28. The non-transitory computer-readable medium of claim 25, further comprising code to:
receive an indication of a scrambling sequence from the base station.

29. The non-transitory computer-readable medium of claim 28, wherein the indication comprises a scrambling sequence index comprised in Radio Resource Control (RRC) signaling or system information signaling.

30. The non-transitory computer-readable medium of claim 25, further comprising code to:

apply a different frequency shift between repetitions of the NPRACH signal.

\* \* \* \* \*